United States Patent [19]
Laurito

[11] 4,189,410
[45] Feb. 19, 1980

[54] PRODUCTION OF SYNTHETIC RESINS AND THEIR USES IN PRINTING INK COMPOSITIONS

[75] Inventor: James J. Laurito, Coraopolis, Pa.

[73] Assignee: Neville Chemical Company, Pittsburgh, Pa.

[21] Appl. No.: 931,094

[22] Filed: Aug. 4, 1978

Related U.S. Application Data

[63] Continuation-in-part of Ser. No. 839,408, Oct. 5, 1977, which is a continuation of Ser. No. 434,270, Jan. 17, 1974, Pat. No. 4,056,498.

[51] Int. Cl.$^2$ .................... C08F 222/00; C08F 222/08
[52] U.S. Cl. .......................... 260/23.7 C; 260/27 BB; 260/101; 526/290
[58] Field of Search .............. 260/23.7 C, 27 BB, 101; 526/290

[56] References Cited

U.S. PATENT DOCUMENTS

| 2,608,550 | 8/1952 | Rowland et al. | 260/27 BU |
| 3,937,674 | 2/1976 | Laarkamp | 260/23.7 C |
| 4,028,291 | 6/1977 | Tsuchiya et al. | 260/23.7 C |
| 4,056,498 | 11/1977 | Laurito | 260/23.7 C |
| 4,126,739 | 11/1978 | Hoene et al. | 526/272 |

Primary Examiner—Ronald W. Griffin
Attorney, Agent, or Firm—Burns, Doane, Swecker & Mathis

[57] ABSTRACT

Synthetic resins suitable for use in printing ink compositions are produced by typically forming a base resin by polymerizing a reaction mixture consisting essentially of (a) a predominant amount of dicyclopentadiene and lesser amounts of (b) at least one hydrocarbon-containing material selected from the group consisting of debutanized aromatic concentrates, $C_5$ olefins and acyclic, conjugated $C_5$ dienes, and (c) at least one member selected from the group consisting of fatty acid-containing materials and rosin acid-containing materials. The base resin may be modified through a reaction with an ethylenically unsaturated lower aliphatic dicarboxylic acid or anhydride, such as maleic anhydride.

17 Claims, No Drawings

PRODUCTION OF SYNTHETIC RESINS AND THEIR USES IN PRINTING INK COMPOSITIONS

CROSS-REFERENCE TO RELATED APPLICATIONS

This application is a continuation-in-part of U.S. patent application Ser. No. 839,408, filed Oct. 5, 1977, which is a continuation of U.S. patent application Ser. No. 434,270, filed Jan. 17, 1974, now U.S. Pat. No. 4,056,498 issued Nov. 1, 1977, both of which are herein incorporated by reference.

BACKGROUND OF THE INVENTION

1. Field of the Invention

This invention relates generally to synthetic resins suitable for printing ink compositions and to processes for their production.

2. Summary of the Prior Art

Hydrocarbon resins suitable for a wide variety of end uses including coatings, asphalt floor tile, and printing ink compositions have been known for many years. See, for example, U.S. Pat. Nos. 2,598,424; 3,290,275; 3,299,034; 3,468,837; 3,523,095 and 3,775,381; and "Recent Developments in Hydrocarbon Resins," K. E. Jackson, *Official Digest*, pp. 372–385, May, 1956; and "Synthetic Resins for Inks", John P. Petrone, *The American Inkmaker*, Vol. 49, (Mar.–Oct. 1971).

The search has continued, however, for new synthetic resins having improved properties, particularly in the printing ink industry, which has searched for a suitable replacement for rosin and rosin derivatives in heat-set and gravure printing ink compositions. The present invention was made as a result of that search.

SUMMARY OF THE INVENTION

Accordingly, a primary object of the present invention is to provide novel synthetic resins suitable for use in compositions such as printing inks.

Another object of the present invention is to provide novel processes for producing synthetic resins suitable for use in compositions such as printing inks.

These and other objects will be apparent to one skilled in this art from the following:

In accordance with one aspect of the present invention, a dibasic acid-modified hydrocarbon resin is provided, which modified resin consists essentially of the reaction product of at least one ethylenically unsaturated lower aliphatic dicarboxylic acid or anhydride, such as maleic anhydride, with a base resin. The base resin consists essentially of a polymerized mixture of: (a) a predominant amount of dicyclopentadiene; and lesser amounts of (b) at least one hydrocarbon-containing material selected from the group consisting of debutanized aromatic concentrates, $C_5$ olefins and acyclic, conjugated $C_5$ dienes, and (c) at least one member selected from the group consisting of fatty acid-containing materials and rosin acid-containing materials. The modified resin has a Ring and Ball softening point of from about 130° C. to about 175° C.; a Gardner color of from about 9 to about 15; a definite Stoddard solubility of from about 0° C. to about 120° C.; an Acid Number of from about 10 to about 30, Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520; and is suitable for use in heat-set and gravure printing ink compositions.

In a more particular aspect of the present invention, a maleic-modified hydrocarbon/fatty acid-containing resin is provided, which maleic-modified resin is suitable for use in heat set and gravure printing ink compositions. The maleic modified resin consists essentially of the reaction product of from about three to about five parts maleic anhydride with about 97 to about 95 parts of a base resin. This base resin consists essentially of a polymerized mixture of: (a) from about 50% to about 75% of dicyclopentadiene or a dicyclopentadiene-rich hydrocarbon fraction containing at least about 70% dicyclopentadiene and minor amounts of methyl dicyclopentadiene and codimers of cyclopentadiene and methyl cyclopentadiene; (b) from about 5% to about 20% of at least one hydrocarbon-containing material selected from the group consisting of debutanized aromatic concentrates, $C_5$ olefins and acyclic conjugated $C_5$ dienes; and (c) from about 10% to about 30% of a fatty acid-containing material selected from the group consisting of saturated fatty acid-containing materials, unsaturated fatty acid-containing materials and mixtures thereof. The maleic-modified resin has a Ring and Ball softening point of from about 140° C. to about 160° C.; a Gardner color of from about 10 to about 13; a definite Stoddard solubility of from about 20° C. to about 90° C.; an Acid Number of from about 15 to about 25; Gardner-Holdt solution viscosities at 25° C. (bubble seconds) of from about 1.15 to about 8.00 (60% resin in 42 Kauri butanol gravure ink solvent) and from about 10.0 to about 50.0 (50% resin in Magie 470 oil); and a number average molecular weight of from about 920 to about 1220.

In another aspect of the present invention, a process is provided for producing a dibasic acid-modified hydrocarbon resin. The process is essentially a two-step process which comprises: (1) copolymerizing a reaction mixture consisting essentially of: (a) predominant amount of dicyclopentadiene; and lesser amounts of (b) at least one hydrocarbon-containing material selected from the group consisting of debutanized aromatic concentrates, $C_5$ olefins and acyclic, conjugated $C_5$ dienes and (c) at least one member selected from the group consisting of fatty acid-containing materials and rosin acid-containing materials to form a base resin; and (2) reacting the base resin with at least one ethylenically unsaturated lower aliphatic dicarboxylic acid or anhydride in an amount sufficient to produce a modified resin having an Acid Number higher than the Acid Number of the base resin. The base resin has a Ring and Ball softening point of from about 120° C. to about 160° C.; a Gardner color of from about 9 to about 15; a definite Stoddard solubility of from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500. The modified resin has a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520; and is suitable for use in heat-set and gravure printing ink compositions.

In another more particular aspect of the present invention, a process is provided for producing a maleic modified hydrocarbon/fatty acid-containing resin suitable for use in heat-set and gravure printing ink compositions. The central features of this process are the following two steps: (1) reacting at a temperature of from about 230° C. to about 270° C. and at autogenous pressure and under agitation a mixture consisting essentially of (a) from about 50 to about 75% of dicyclopentadiene or a dicyclopentadiene-rich hydrocarbon fraction containing at least about 70% dicyclopentadiene and minor amounts of methyl dicyclopentadiene and codimers of cyclopentadiene and methyl cyclopentadiene; (b) from about 5 to about 20% of at least one material selected from the group consisting of debutanized aromatic concentrates, $C_5$ olefins and acyclic, conjugated $C_5$ dienes; and (c) from about 10 to about 30% of a fatty acid-containing material selected from the group consisting of saturated fatty acid-containing materials, unsaturated fatty acid-containing materials and mixtures thereof to produce a base resin having a Ring and Ball softening point of from about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 6.30 (60% resin in 42 Kauri butanol gravure ink solvent) and from about 3.20 to about 30 (50% resin in Magie 470 oil); and a number average molecular weight of from about 900 to about 1200; and (2) reacting at a temperature of from about 200° C. to about 240° C. and under an inert gas blanket from about 3 to about 5 parts of maleic anhydride and from about 97 to about 95 parts of the base resin until a maleic-modified resin having a Ring and Ball softening point of from about 140° C. to about 160° C.; a Gardner color of from about 10 to about 13; a definite Stoddard solubility of from about 20° C. to about 90° C.; an Acid Number of from about 15 to about 25; Gardner-Holdt solution viscosities at 25° C. (bubble seconds) of from about 1.15 to about 8.00 (60% resin in 42 Kauri butanol gravure ink solvent) and from about 10.0 to about 50.0 (50% resin in Magie 470 oil); and a number average molecular weight of from about 920 to about 1220, is produced.

In another aspect of the present invention, a base resin is provided which is suitable for use in heat-set and gravure ink printing compositions. The base resin consists essentially of a polymerized mixture of:

(a) a predominant amount of dicyclopentadiene; and lesser amounts of (b) at least one hydrocarbon-containing material selected from the group consisting of debutanized aromatic concentrates, $C_5$ olefins and acyclic, conjugated $C_5$ dienes; and (c) at least one member selected from the group consisting of fatty acid-containing materials and rosin acid-containing materials.

The base resin has a Ring and Ball softening point of from about 120° C. to about 160° C.; a Gardner color of from about 9 to about 15, a definite Stoddard solubility from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

In another aspect of the invention, a base resin is provided which consists essentially of a polymerized mixture of:

(a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene;

(b) from about five to about twenty percent of at least one hydrocarbon-containing material selected from the group consisting of debutanized aromatic concentrates, $C_5$ olefins and acyclic, conjugated $C_5$ dienes; and (c) from about ten to about thirty percent of a fatty acid-containing material selected from the group consisting of saturated fatty acid-containing materials, unsaturated fatty acid-containing materials, and mixtures thereof. A base resin is produced which has a Ring and Ball softening point of from about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 6.30 (60% resin in 42 Kauri butanol gravure ink solvent) and from about 3.20 to about 30 (50% resin in Magie 470 oil); and a number average molecular weight of from about 900 to about 1200.

In another aspect of the present invention, a process for producing a base resin is provided which process comprises:

copolymerizing a reaction mixture consisting essentially of:

(a) a predominant amount of dicyclopentadiene; and lesser amounts of (b) at least one hydrocarbon-containing material selected from the group consisting of debutanized aromatic concentrates, $C_5$ olefins and acyclic, conjugated $C_5$ dienes; and (c) at least one member selected from the group consisting of fatty acid-containing materials and rosin acid-containing materials.

A base resin is formed which has a Ring and Ball softening point of from about 120° C. to about 160° C.; a Gardner color of from about 9 to about 15; a definite Stoddard solubility of less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

In another aspect of the present invention, a process for producing a base resin is provided, which process comprises: at a temperature of from about 230° C. to 270° C. and at autogenous pressure and under agitation, reacting a mixture consisting essentially of:

(a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene;

(b) from about five to about twenty percent of a hydrocarbon-containing material selected from the group consisting of debutanized aromatic concentrates, $C_5$ olefins and acyclic, conjugated $C_5$ dienes; and (c) from about ten to about thirty percent of a fatty acid-containing material selected from the group consisting of saturated fatty acid-containing materials, unsaturated fatty acid-containing materials, and mixtures thereof.

A base resin is produced which has a Ring and Ball softening point of from about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 1.30 (60% resin in 42 Kauri butanol gravure ink solvent) and from about 3.20 to about 30 (50% resin in Magie 470 oil); and a number average molecular weight of from about 900 to about 1200.

In yet another aspect of the present invention, an improved hydrocarbon resin is provided which is suitable for use in heat-set and gravure printing ink compositions. The resin consists essentially of the reaction product of:

(a) a predominant amount of dicyclopentadiene; and lesser amounts of (b) at least one hydrocarbon-containing material selected from the group consisting of debutanized aromatic concentrates, $C_5$ olefins and acyclic, conjugated $C_5$ dienes;

(c) at least one member selected from the group consisting of fatty acid-containing materials and rosin acid-containing materials; and (d) at least one ethylenically unsaturated lower aliphatic dicarboxylic acid or anhydride.

The resin has a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

In yet another aspect of this invention, a base resin is prepared which is suitable for use in heat-set and gravure ink printing compositions. The base resin consists essentially of a polymerized mixture of:

(a) a predominant amount of a member selected from the group consisting of methyl dicyclopentadiene and dimethyldicyclopentadiene; and lesser amounts of (b) at least one hydrocarbon-containing material selected from the group consisting of debutanized aromatic concentrates, $C_5$ olefins and acyclic, conjugated $C_5$ dienes; and (c) at least one member selected from the group consisting of fatty acid-containing materials and rosin acid-containing materials.

The base resin has a Ring and Ball softening point of from about 120° C. to about 160° C.; a Gardner color of from about 9 to about 15, a definite Stoddard solubility from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

In another aspect of the present invention, a process is provided for producing an improved hydrocarbon resin suitable for use in heat-set gravure ink compositions. The process comprises reacting at a temperature of from about 245° C. to about 250° C. for a period of about 16 to about 24 hours a mixture consisting essentially of:

(a) a predominant amount of dicyclopentadiene and lesser amounts of (b) at least one hydrocarbon-containing material selected from the group consisting of debutanized aromatic concentrates, $C_5$ olefins and acyclic, conjugated $C_5$ dienes;

(c) at least one member selected from the group consisting of fatty acid-containing materials and rosin acid-containing materials; and (d) at least one ethylenically unsaturated lower aliphatic dicarboxylic acid or anhydride. The ethylenically unsaturated lower aliphatic dicarboxylic acid or anhydride is present in an amount sufficient to produce a resin having a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

In other aspects of the present invention, the base resins and processes for producing same as described above are provided for.

The central feature of the present invention is the discovery of a novel synthetic resin having properties desirable for use in printing ink compositions, including heat-set and gravure inks. The properties include (i) reasonably high soft points, e.g., between about 120° C. and 175° C. (Ring and Ball); (ii) light color, e.g., up to about 3, and more typically up to about 2 (Barrett method), or between about 9 and about 15 (Gardner method); (iii) reasonably high solubility in the relatively poor solvents typically used in inks, e.g., Magie 470 oil (heat-set) or 42 Kauri butanol gravure ink solvent; (iv) the ability to "wet" pigments in ink formulae (thought to be a function of the Acid Number of the resin); and (v) a reasonably high solution viscosity in relatively low solvent power ink solvents at 50% to 60% resin concentration (the importance of this property is pointed out by the fact that in certain instances the ink industry requires a relatively viscous paste ink consistency for application, and in other instances may wish a substantially less viscous ink formulation). The resins of the present invention generally exhibit a high level and wide range of solubility-compatibility properties. Moreover, the resins of the present invention can be used as the sole resin or in combination with or as an extender for other resins in both heat set ink compositions and gravure ink compositions. And in such printing ink compositions, the resins of the present invention have also been found to give improved solvent release and improved gloss, as well as giving excellent ink drawdowns (Meyer Bar), and decreased odor. The resins of the present invention are also useful when incorporated into a gelled varnish formulation, e.g., with an ink oil and gelling agent. Other aspects and advantages of the present invention will become apparent to one skilled in this art from the following description of the preferred embodiments.

DESCRIPTION OF THE PREFERRED EMBODIMENTS

As indicated above, the novel synthetic resins of the present invention are typically produced by a process including forming a base resin by polymerizing a reaction mixture consisting essentially of (a) a predominant amount of dicyclopentadiene and lesser amounts of (b) at least one hydrocarbon-containing material selected from the group consisting of debutanized aromatic concentrates, $C_5$ olefins and acyclic, conjugated $C_5$ dienes and (c) at least one member selected from the group consisting of fatty acid-containing materials and rosin acid-containing materials.

Dicyclopentadiene is well known per se. Substantially pure, e.g., 95% to essentially 100% by weight, dicyclopentadiene feed stock may be used. Alternatively, a dicyclopentadiene-rich hydrocarbon fraction may also be used. Typically such dicyclopentadiene-rich hydrocarbon fraction may contain at least about 40%, and more typically at least about 70% by weight dicyclopentadiene and minor or lesser amounts, e.g. from about 1% to about 30% by weight, of methyl dicyclopentadiene and codimers of cyclopentadiene and methyl cyclopentadiene. It may also be possible to employ as the first principal component essentially 100% by weight of methyl dicyclopentadiene or di-methyl-dicyclopentadiene. Other materials may be present in the dicyclopentadiene-rich hydrocarbon fraction in amounts which do not materially affect the performance of the dicyclopentadiene-rich hydrocarbon fraction as used in the present invention. Other materials which may be present include, e.g., aromatic olefinic monomers such as vinyl toluene, styrene, alpha-methyl styrene, indene, coumarone, methyl coumarone, dimethyl styrenes and methyl indenes, other inert aromatic hydrocarbons such as benzene, toluene, $C_8$ aromatics, cumene, ethyl toluenes, 1,2,4-trimethyl benzene, 1,2,3-trimethyl benzene, 1,3,5-trimethyl benzene, indane and naphthalene, various inert non-aromatic hydrocarbons, and diolefinic cyclic hydrocarbons such as $C_5$ codimers and $C_4$-$C_5$ codimers including vinyl norbornene. Generally, the aromatic olefinic monomers should be present in the dicyclopentadiene-rich hydrocarbon feed stream in an amount such that there is present in the improved resins of the present invention less than about 35 weight percent reacted or combined aromatic olefinic monomers based on the total weight of the resin. The inert material, including inert aromatic hydrocarbons and inert non-aromatic hydrocarbons, may be present in the dicyclopentadiene-rich hydrocarbon fraction in an amount of less than about 30 weight percent based on the total weight of the three principal components of the reaction mixture including inerts. The phrase "inert" is used herein to designate hydrocarbon materials which, while they may be involved in some side reactions during the production of the resins of the present invention, are not involved in the reactions which directly result in production of those resins. Preferably, such inerts are present in amounts less than about 15 weight percent. Typically, non-aromatic inert hydrocarbons are preferred. The diolefinic cyclic hydrocarbons may be present in amounts up to about 15 weight percent based on the total weight of the first principal component. As also indicated above, the first principal component is present in the initial reaction mixture in a predominant amount, i.e., in an amount greater than either of the other two principal components of the reaction mixture. For example, the first principal component may be present in a predominant amount in the reaction mixture, i.e., in an amount from about 40% to about 85% or more, preferable in an amount of from about 50% to about 75%, based on the total weight of the three principal components in the reaction mixture.

The second principal component in the initial reaction mixture is at least one hydrocarbon-containing material selected from the group consisting of debutanized aromatic concentrates, $C_5$ olefins and acyclic, conjugated $C_5$ dienes. More particularly, debutanized aromatic concentrates as contemplated herein include Debutanized Aromatic Concentrate-B (DAC-B) and Debutanized Aromatic Concentrate-C (DAC-C). DAC-B is a complex mixture of saturated, unsaturated and aromatic hydrocarbons having an initial boiling point greater than about 60° C. Typically, DAC-B contains from about 87% to about 91% carbon and from about 9% to about 13% hydrogen and has an iodine number ranging from about 195 to about 350. DAC-B contains approximately 70 different compounds, including toluene, mixed xylenes, styrene, 5-methyl-bicyclohept-2-ene and 6-methylene-5-methyl-bicyclohept-2-ene.

Typically, DAC-B may comprise a mixture of aromatics, olefins and paraffins. One typical analysis of DAC-B is set out in Table I herein. This analysis includes a determination of the typical major components and typical properties of DAC-B.

TABLE I

| Typical Major Components | Percent (volume) |
|---|---|
| Paraffins (Normal and Iso) | 2.31 |
| Naphthenes | 8.68 |
| Benzene | 1.07 |
| Toluene | 10.70 |
| $C_7$ Triolefins and/or Dicyclic | 11.77 |
| Xylenes | 8.02 |
| Ethyl Benzene | 3.69 |
| Ortho-Xylene | 1.44 |
| Meta-Xylene | 1.94 |
| Para-Xylene | 0.95 |
| $C_8$ Triolefins and/or Dicyclic Olefins | 10.70 |
| $C_9$ Benzenes | 5.34 |
| $C_9$ Triolefins and/or Dicyclic Olefins | 10.70 |

| Typical Properties | |
|---|---|
| ASTM Distillation Range (100 ml sample) [ASTM D-850, herein incorporated by reference] | |
| First Drop | approx. 119° C. |
| 10 ml | approx. 146° C. |
| 50 ml | approx. 193° C. |
| 98 ml | approx. 315° C. |
| Residue | approx. 5 ml |
| Color, Varnish Scale | approx. 6 |
| Specific Gravity, 15.6/15.6° C. | approx. 0.940 |

TABLE I-continued

| Typical Major Components | Percent (volume) |
|---|---|
| Water Content | approx. <0.01% |

DAC-B is typically prepared by the pyrolysis of a natural gas stream predominantly comprising propane or propane-ethane mixtures. Thus, the exact composition of DAC-B may vary and is to some extent a function of the natural gas cracking feed and the various operating conditions, e.g., processing temperature, processing pressure and processing residence time, maintained during the preparation process. A typical DAC-B product is described in more detail and may be made, e.g., in accordance with the procedures set out in U.S. Pat. Nos. 3,357,914, 3,437,629, 3,467,615 and 3,701,760 all of which are herein incorporated by reference.

DAC-C typically comprises a predominant amount of $C_9$–$C_{15}$ cyclic, bicyclic, tricyclic and polycyclic olefins and diolefins and toluene. Typically, DAC-C has a specific gravity at about 15.6° C. of about 0.921 and a Gardner Color of about 1 (Gardner method ASTM D-1544). A typical analysis of the major components and properties of DAC-C is set out in Table II, but it is to be understood that the composition and properties of DAC-C may vary to some extent.

TABLE II

| Typical Major Components | Percent (Volume) |
|---|---|
| Benzene | trace |
| Toluene | 1.2–17.7 |
| Ethylene | 0.6–4.2 |
| $C_9$ Bicyclic Olefins | 0.6–1.1 |
| $C_9$ Bicyclic Diolefins | 1.5–3.1 |
| $C_{10}$ Cyclic Diolefins | 0.3–0.4 |
| $C_{10}$ Bicyclic Olefins | 6.0–8.8 |
| $C_{10}$ Bicyclic Diolefins | 6.5–7.8 |
| $C_{10}$ Tricyclic Olefins | 7.9–10.0 |
| $C_{10}$ Tricyclic Diolefins | 5.9–15.8 |
| $C_{11}$ Tricyclic Olefins | 1.5–2.1 |
| $C_{12}$ Tricyclic Diolefins | 0.7–2.2 |
| $C_{14}$ Polycyclic Diolefins | 0.4–0.7 |
| $C_{15}$ Polycyclic Olefins | 2.5–3.9 |
| $C_{15}$ Polycyclic Diolefins | 1.2–2.3 |
| Typical Properties | |
| ASTM Distillation Range (100 ml sample) [ASTM D-850] | |
| First Drop | 112°–126° C. |
| 10 ml | 137°–148° C. |
| 50 ml | 174°–216° C. |
| 96–99 ml | 260°–358° C. |
| Residue | 1–4 ml |
| Color, Varnish Scale | 1–5 |
| Specific Gravity, 15.6/15.6° C. | 0.92–0.95 |
| Water Content | < 0.1–0.2% |

Typical of the second component $C_5$ olefins are 1-pentene, 2-methyl-1-butene, 2-methyl-2-butene, cyclopentene cis-2-pentene and trans-2-pentene. The term "acyclic, conjugated $C_5$ dienes" as used herein is meant to consist essentially of isoprene, cis-piperylene and trans-piperylene. The debutanized aromatic concentrates, $C_5$ olefins and acyclic, conjugated $C_5$ dienes of the second principal component may include cyclopentadiene, preferably in minor amounts. A typical second component mixture may consist essentially of an equal volume percent mixture of 2-methyl-2-butene, 1-pentene, cis-2-pentene, mixed 2-pentene and cyclopentene. Another typical second component may consist of about 20 volume percent isoprene and about 80 volume percent piperylene.

The second principal component is typically present in an amount substantially less than the dicyclopentadiene component. For example, the second component may be present in an amount from about 5% to about 30%, and more preferably from about 5% to about 20%, of the total weight of the three principal components in the initial reaction.

The third principal component of the initial reaction mixture is at least one member selected from the group consisting of fatty acid-containing materials and rosin acid-containing materials.

The fatty acid-containing materials include saturated fatty acid-containing materials, unsaturated fatty acid-containing materials and mixtures thereof. Generally, the fatty acids in the fatty acid-containing materials are saturated or unsaturated monocarboxylic acids containing from about 12 to about 22 carbon atoms per molecule or mixtures thereof. Typical fatty acid-containing materials suitable for incorporation as the third principal component in the initial reaction mixture include, e.g., vegetable acids, animal acids, fish acids and tall oil. The fatty acids contained in the third principal component in the initial reaction mixture may include olefinic fatty acids, diolefinic fatty acids, conjugated diolefinic acids, polyolefinic fatty acids and alicyclic fatty acids.

Typical fatty acid-containing materials include coconut oil, palm kernel oil, corn oil, cottonseed oil, olive oil, palm oil, peanut oil, sesame oil, sunflowerseed oil, linseed oil, soybean oil, rapeseed (colza) oil, tung (China wood) oil and castor oil. Typical animal fatty acid-containing materials include lard and tallow. Typical fish fatty acid-containing materials include whale oil, gray seal oil, menhaden oil, cod liver oil, Japanese sardine oil, herring oil and California sardine (pilchard) oil. Typical saturated fatty acids include lauric acid, myristic acid, palmitic acid, margaric acid, stearic acid and arachidic acid. Typical olefinic fatty acids include undecylenic acid, lauroleic acid, physeteric acid, myristoleic acid, palmitoleic acid, hydnocarpic acid, petroselinic acid, oleic acid, elaidic acid, chaulmoogric acid and erucic (cis) acid. Typical diolefinic acids include α-linoleic acid. Typical conjugated diolefinic acids include α-eleostearic acid, β-eleostearic acid and tung (China wood) oil. Typical polyolefinic acids include α-linoleic acid, α-eleostearic acid, β-eleostearic acid and linolenic acid. Typical alicyclic fatty acids include hydnocarpic acid and chaulmoogric acid. The various fatty acid-containing matererials are described in further detail in Kirk-Othmer Encyclopedia of Chemical Technology, Volume 8, pp 811–856 (1965) and Volume 1, pp 224–240 (1963) herein incorporated by reference.

Typical rosin acid containing materials suitable for incorporation as the third principal component in the initial reaction mixture include, e.g., rosins, particularly gum rosin, wood rosin and tall oil rosin. Rosin acids typically have the molecular formula $C_{20}H_{30}O_2$. The rosin acids contained in the third principal component of the initial reaction mixture may include, e.g., abietic acid, dehydro-abietic acids, palustric acid, neo-abietic acid, isopimaric acid, dihydro-abietic acid, tetrahydroabietic acid, isodextro-pimaric acid, dextropimaric acid, pimaric acid, Δ8,9-isopimaric acid, sandaraco-pimaric acid, levo-pimaric acid, elliotinoic acid, dihydro-isopimaric acid, dihydro-pimaric acid, tetrahydro-isopimaric acid and tetrahydro-pimaric acid. The various rosins such as tall oil rosin, gum rosin and wood rosin acids are discussed in greater detail, e.g., in Kirk-Othmer Encyclopedia of Chemical Technology, Volume 17, pp. 475–508 (1968), which is herein incorporated by reference.

The tall oil composition typically utilized as the third principal component in the initial reaction mixture is refined tall oil, i.e., crude tall oil which has been refined such as by distillation. The refined tall oil typically consists essentially of a predominant amount of tall oil fatty acids and lesser amounts of tall oil rosin acids. For example, the refined tall oil may contain from about 50% to about 70% fatty acids, and from about 30% to about 50% rosin acids. Other tall oil compositions containing, for example, from about 10% to about 90% fatty acids and from about 90% to about 10% rosin acids may also be used. Tall oil and particularly refined or distilled tall oil are well known per se and the manner in which they are produced, derived or obtained is not part of the invention.

The fatty acid-containing material may be present in the initial reaction mixture in an amount less than that of the dicyclopentadiene reaction component and, for example, may be present in an amount from about 5% to about 35% based on the total weight of the three principal reactive components. Preferably, the fatty acid-containing material is present in an amount from about 10% to about 30% weight of the reaction mixture.

The rosin acid-containing material may be present in the initial reaction mixture in an amount less than that of the dicyclopentadiene reactant component and, for example, may be present in an amount from about 5% to about 15%, preferably from about 5% to about 10% by weight of reaction mixture.

The initial reaction mixture containing the above-described three principal reactants or components may be polymerized over a wide range of temperatures as can be seen by one skilled in the art in view of the disclosure herein. For example, the reaction temperatures may range from about 200° C. up to about 290° C., preferably from about 230° C. to about 270° C., and most preferably from about 245° C. to about 250° C.

The pressures employed in the initial reaction zone to produce the base resin are not thought to be critical, with a pressure sufficient to prevent substantial loss by evaporation of the reactants typically being used. Subatmospheric, atmospheric and superatmospheric pressures may be employed, and autogenous pressure in a substantially sealed reaction vessel is typically convenient.

If desired, aromatic olefinic monomers such as vinyl toluene, styrene, alpha-methyl styrene, indene, coumarone, methyl coumarone, dimethyl styrenes and methyl indenes, or inert, aromatic diluents such as toluene, benzene, $C_8$ aromatics, cumene, ethyl toluenes, 1,2,4-trimethyl benzene, 1,2,3-trimethyl benzene, 1,3,5-trimethyl benzene, indane and naphthalene, may also be present in the reaction zone or mixture. Such materials may be present as described above in the first principal component. Alternatively, these materials may be present in the other principal components or may be incorporated separately into the reaction zone or mixture. The aromatic olefinic monomers may be separately incorporated in an amount such that there is present in the improved resins of the present invention less than about 35 percent reacted or combined aromatic olefinic monomers based on the total weight of the resin. The inerts may be present in an amount of less than about thirty percent, and preferably less than about 15 percent, based on the total weight of the three principal components of the reaction mixture including inerts.

The initial polymerization reaction is typically characterized as a thermal polymerization and is most preferably conducted in the absence of any catalyst. Where the initial reaction mixture is thermally polymerized, temperatures of from about 200° C. to about 290° C., and preferably from about 230° C. to about 270° C. are typical.

Alternately, the initial reaction mixture containing the above-described three principal reactants or components may be catalytically polymerized. Typical of catalysts which may be employed in the initial reaction are peroxides such as di-tert-butylperoxide; dilauroylperoxide; dicumylperoxide; 2,5-bis-(tert-butylperoxy) hexane; 2,5-dimethyl-2,5-bis-(tert-butylperoxy)- hexene; dibenzoylperoxide; cumene hydroperoxide and/or Friedel-Crafts metal salt catalysts such as aluminum chloride, stannic chloride, boron trifluoride or the complex compounds of boron trifluoride, e.g., boron trifluoride hydrate, boron trifluoride ethyl ether, and boron trifluoride phenol. If catalysts are employed, it is possible to work at temperatures of e.g., from about −20° C. to about 270° C., preferably from about 40° C. to about 250° C.

Any conventional reactor vessel may be employed for this initial polymerization reaction, and the polymerization reaction may be conducted in a batch, semi-continuous or continuous manner. Preferably, the polymerization reaction is carried out under agitation, e.g., in a stirred reactor vessel.

The initial reaction mixture of the above-described three principal reactants or components is typically maintained at reaction temperature until the desired degree of polymerization is reached. Typically, reaction is maintained until a base resin having a Ring and Ball softening point of from about 120° C. to about 160° C., more typically from about 130° C. to about 150° C. (as measured by ASTM E-28, herein incorporated by reference), and an Acid Number of from about 1.5 to about 6, preferably from about 3 to about 5, is produced. The base resin has a color of up to about 3 (as measured by the Barrett visual method No. 106, herein incorporated by reference), preferably of up to about 2, or from about 9 to about 15 (as measured by the Gardner method ASTM D-1544, herein incorporated by reference), preferably from about 10 to about 13, a definite standard Stoddard solubility precipitation temperature (herein referred to as definite Stoddard solubility) of from less than about −60° C. to about +40° C., preferably from about less than −60° C., to about +10° C. (point of definite cloud as measured by the method set out in U.S. Pat. Nos. 2,565,222, 3,422,053, and 3,468,837 herein incorporated by reference), a resin mixed (normal heptane) aniline point (hereinafter resin aniline point) of from about 60° C. to 110° C., preferably from about 70° C. to about 85° C. (as measured by ASTM D-1012, herein incorporated by reference), an ASTM Wijs Iodine number of from about 120 to about 200, preferably from about 130 to about 180 (as measured by ASTM D-1959, Wijs, herein incorporated by reference), and molecular weight (number average) of from about 800 to about 1500, preferably from about 900 to about 1200. The base resin exhibits Gardner-Holdt solution viscosities at 25° C. (bubble seconds) of from about 0.05 to about 8.00, preferably of from about 1.15 to about 6.30 (60% resin in 42 Kauri butanol gravure ink solvent) and from about 1.15 to about 50, preferably from about 3.20 to about 30 (50% resin in 30 Kauri butanol heat set ink oil (herein referred to as Magie 470 oil)). Reaction times for the initial reaction may range from about twelve hours to about thirty-six hours, and more typically may range from about sixteen to about twenty-four hours.

"Acid Number" as used herein refers to a colorimetric method wherein approximately one gram of the resin is dissolved in 50 ml. of an Acid Number solution consisting of two parts of technical grade toluene, one part of technical grade isopropyl alcohol and a few drops of phenolphthalein indicator. The resin solution is then titrated with a 0.1 N alcoholic potassium hydroxide solution (methyl) to a slight pink color. The Acid Number is then calculated as follows:

$$\text{Acid Number} = \frac{(\text{ml. KOH Soln.}) \times (5.61)}{(\text{gms. resin})}$$

The base resin may be recovered from the reaction mixture by conventional methods such as distillation, e.g., steam distillation or stripping, or other conventional recovery methods known to those skilled in the art.

The resulting base resin may be used directly in various coating and/or printing compositions, but preferably is thereafter reacted with at least one ethylenically unsaturated lower aliphatic dicarboxylic acid or anhydride in an amount sufficient to produce a modified resin having an Acid Number higher than the Acid Number of the base resin. The higher Acid Number value is desirable for sufficient "wetting" of the ink pigments in the ink compositions. The dibasic acid-modified resin typically also exhibits an increased Ring and Ball softening point and an increased solution viscosity in relatively low solvent power ink solvents at 50% and 60% resin concentration. The modified resin is useful when incorporated into a gelled varnish formulation, e.g., with an ink oil and a gelling agent. The higher Acid Number value provides a resin having desirable gel characteristics in such formulations.

The ethylenically unsaturated lower aliphatic dicarboxylic acids or anhydrides found suitable include maleic anhydride, fumaric acid and half esters of maleic anhydride. Maleic anhydride is most preferred and has been found to yield a modified resin having the best combination of properties for use in heat-set and gravure printing ink compositions. Other ethylenically unsaturated lower aliphatic dicarboxylic acids or anhydrides which may be suitable include fumaric acid, glutaconic acid, glutaconic anhydride, itaconic acid, itaconic anhydride, citraconic acid, citraconic anhydride, mesaconic acid, tetrahydrophthalic acid, tetrahydrophthalic anhydride, methyltetrahydrophthalic acid, and methyltetrahydrophthalic anhydride.

As indicated above, the base resin is reacted with an ethylenically unsaturated dicarboxylic acid or anhydride under conditions sufficient to increase the Acid Number of the base resin.

For example, from about one to about ten parts of at least one ethylenically unsaturated lower aliphatic dicarboxylic acid or anhydride may be reacted with from about 99 to about 90 parts of the base resin, and preferably from about three to about five parts of the dicarboxylic acid or anhydride are reacted with from about 97 to about 95 parts of the base resin.

The reaction between the dicarboxylic acid or anhydride and the base resin may be conducted over a wide range of temperatures depending upon the specific dicarboxylic acid chosen and the specific base resin used. For example, reaction temperatures from about 180° C. to about 250° C., preferably from about 200° C. to about 240° C., and most preferably from about 210° C. to 235° C. may be used.

The reaction may be typically carried out in the absence of any catalyst, although a free radical initiator such as an organic peroxide, e.g., di-tertiary butyl peroxide and dicumyl peroxide, may be used. When such a catalyst is employed, reaction temperatures from about 100° C. to about 250° C., preferably from about 150° C. to about 230° C. and most preferably from about 180° C. to about 220° C. may be used. A solvent or diluent may also be incorporated.

The reaction pressures are not thought to be critical, with a pressure sufficient to prevent substantial loss by evaporation of the reactants typically being used. Subatmospheric, atmospheric and superatmospheric pressures may be employed. Most preferably, the reaction is conducted under substantially oxygen-free conditions to prevent darkening of the color of the resulting resin. Conveniently, the reaction can be conducted under an inert gas blanket such as by passing nitrogen or carbon dioxide gas through the reactor vessel and over the reaction mixture. Any conventional stirred or non-stirred reactor vessel may be employed for the reaction. The reaction may be conducted in a batch, semicontinuous or continuous manner.

The reaction between the anhydride or acid and the base resin is typically maintained at reaction temperature until the desired Acid Number is reached. Typically, the reaction will be maintained for a period sufficient to produce a modified resin having a Ring and Ball softening point of from about 130° C. to about 175° C., preferably from about 140° C. to about 160° C., a color (as measured by the Barrett method) of less than about 3, and preferably of less than about 2, or a color (as measured by the Gardner method) from about 9 to about 15, and preferably from about 10 to about 13. The modified resin has a definite Stoddard solubility of from about 0° C. to about 120° C., preferably from about 20° C. to about 90° C., a resin aniline point of from about 40° C. to about 100° C., preferably from about 50° C. to about 90° C., an Acid Number of from about 10 to about 30, and preferably from about 15 to about 25, an ASTM Wijs Iodine number of from about 110 to about 190 preferably from about 120 to about 170 and a molecular weight (number average) of from about 820 to about 1520, preferably from about 920 to about 1220. The modified resin exhibits Gardner-Holdt solution viscosities at 25° C. (bubble seconds) from about 0.92 to about 15.0, preferably from about 1.15 to about 8.00 (60% resin in 42 Kauri butanol gravure ink solvent) and from about 8.00 to about 100, preferably from about 10.0 to about 50.0 (50% resin in Magie 470 oil). Reaction times may range from about one hour to about ten hours, for example, and more typically may range from about three to about six hours.

A modified resin may then be recovered from the reaction mixture by conventional methods such as distillation, e.g., steam distillation or stripping, or other conventional recovery methods known to those skilled in this art.

The resin is soluble in a wide variety of solvents including typical aliphatic hydrocarbon solvents such as mineral spirits, n-heptane, methyl cyclohexane, n-hexane, and n-decane. Advantageously, the acid-modified resins of the present invention are soluble in gravure and heat-set ink solvents. Gravure inks are generally thin and non-oily. The viscosity range is generally from 10 to 300 centipoise, and these inks are often extended with whiting, china clay or other inexpensive fillers. Heat-set inks have a wide range of consistency which can vary from being very thick or viscous down to about 500 centipoises viscosity, which is generally suitable for high speed rotary presses.

As indicated above, the acid-modified resins of the present invention also exhibit "wetting" properties for ink pigments, and will release the ink solvent rapidly and completely at drying temperatures.

The modified resins of the present invention may also be prepared by simultaneously reacting the four principal reaction components. For example, the components could be charged to a reactor and then heated in the reactor to a temperature of about 245° C. over a period of above three to about three and one-half hours. This reaction mixture is generally held at a temperature of about 245° C. to about 250° C. for a period of about 16 to about 24 hours. Where the reactor is sealed and unstirred, maximum pressures obtained during reaction are about 110 pounds per square inch at the end of the reaction period. The reactor is allowed to cool to about 140° C. over a period of about one and one-half hours. The resulting viscous molten polymers are processed, e.g., by steam distillation to remove unreacted solvents and oils. Such steam distillation may be carried out at temperatures of up to about 250° C. When prepared in this manner, however, increased moisture contamination and resulting corrosion may result. The improved resin may also exhibit lower number average molecular weight and Ring and Ball softening point.

The resins of the present invention exhibit an unexpectedly high level and wide range of solubility-compatibility properties which permit the resins to be employed in the preparation of a wide variety of ink formulations. The resins of this invention can thus be utilized in relatively low solubility ink formulations as well as in medium and high solubility ink formulations. Preferably, these resins provide a desirable balance or intermediate range of both solubility and compatibility properties. That is, the resins are not too soluble or too insoluble, or too compatible or too incompatible for the various ink formulations in which they may be utilized. This is quite significant when it is realized that the exact degree of solubility and compatibility required for a particular ink formulation varies widely among the possible formulations in which the resins of the present invention may be utilized.

Several factors are helpful in defining the solubility-compatibility properties of the resins of the present invention. These factors include properties such as definite Stoddard solubility, resin aniline point and dilution tolerance value. The latter of the properties reflects the weight percent of ink solvent or ink oil which can be added in a stepwise manner to a clear solution of a modified resin to the present invention (40–60 weight percent solution of a resin in a particular ink solvent of ink oil) before a cloudiness appears in the solution. Titration is performed with the same solvent or oil in which the starting resin is dissolved. Generally a dilution tolerance value of from about 50 to about 200 (weight percent) is desirable.

To be used in printing, the resins of this invention are dissolved with an appropriate solvent and carbon black or other desired colorant. Other conventional ingredients such as solid extenders, auxiliary polymeric binders and other functional organic or inorganic compounds may be included in the vehicle which is composed of resin dissolved in a hydrocarbon solvent which is usually aliphatic in nature. The preferred solvents for heat-set inks are highly refined hydrocarbon oils which are relatively high boiling and boil within a relatively narrow range, e,g., between about 230° C. and 330° C. Particularly preferred are essentially aliphatic solvents which have a boiling range that does not exceed over more than about a 50° C. interval, e.g., between about 250° C. and about 300° C., and which have a Kauri butanol value of less than about 40 milliliters and preferably less than about 35 milliliters (as compared to a value of 105 milliliters for toluene). In making up an ink composition, the hydrocarbon is dissolved in a suitable ink solvent. Carbon black or other pigment may be dispersed in the resin solvent until a uniform dispersion of the pigment in the ink vehicle is obtained. If desired, it is possible to prepare an ink concentrate in this fashion which is only subsequently diluted with additional solvent to the concentration appropriate for use in the printing operation. Typically, for instance, an ink composition used in a printing operation may contain between about 10% and about 50% of the resin, between about 100 to aout 200 parts of carbon black or other pigment or colorant per 100 parts of resin, the balance consisting essentially of an aliphatic hydrocarbon solvent.

The modified resins of the present invention are also useful when incorporated into a gelled varnish formulation, e.g., with an ink oil and a gelling agent.

The invention will next be illustrated in terms of specific examples. In these examples, as well as in the other parts of the present specification and appended claims, it should be understood that all amounts and proportions of materials are expressed on a weight basis unless otherwise indicated.

EXAMPLE I

In this run, approximately 750 grams of an initial reaction mixture consisting essentially of approximately 72.0% of a dicyclopentadiene-rich hydrocarbon fraction, approximately 14.0% Debutanized Aromatic Concentrate-B (DAC-B) and approximately 14.0% distilled tall oil (as indicated in Table III) were charged to a thermal polymerization bomb and reacted for a period of about 19 hours at a temperature of from about 245 to about 250° C. The dicyclopentadiene-rich hydrocarbon fraction contained approximately 70% dicyclopentadiene. The distilled tall oil contained approximately 50% monomeric fatty acids, approximately 8% dimerized fatty acids, approximately 6% esterified fatty acids, approximately 33% rosin acid and approximately 2% unsaponifiables. The distilled tall oil had a Gardner number (ASTM D-1544) of about 7, and an Acid Number of about 180; saponification number was about 186, and specific gravity at 25° C. was about 0.95. At the end of the reaction period, a base resin was obtained having physical properties as set out in Table III.

About 97 parts by weight of the base resin thus obtained were reacted with about 3 parts by weight of maleic anhydride under an inert nitrogen blanket at a temperature of from about 210° to about 235° C. for three hours.

The resulting maleic-modified hydrocarbon resin was found to have physical properties as set out in Table III.

A typical heat set ink formula utilizing this maleic-modified hydrocarbon resin consists of 55.7% resin varnish which in turn consists of 50% of a maleic-modified resin in Magie 470 heat set ink oil, 12.8% aluminum hydrate, 8.6% phthalocyanine blue, 2.15% polyethylene wax, and an additional 20.75% Magie 470 heat set ink oil.

A typical gravure ink formula utilizing the maleic-modified resin consists of 50% resin solution which in turn consists of 60% maleic-modified resin in 42 Kauri butanol gravure ink solvent, 15% Duplex Barium Lithol Red pigment, 5% ethyl cellulose solution which in turn consists of 25% ethyl cellulose in isopropanol, 10% "VM&P" naphtha hydrocarbon solvent, 2% toluene and 18% 42 Kauri butanol gravure ink solvent.

TABLE III

Component and Physical Property Data for Examples I-III

| Component No. 1 | Example I Wt. % | Example II Wt. % | Example III Wt. % |
|---|---|---|---|
| DCPD | 48.0 | 55.4 | 62.7 |
| Me-DCPD | 7.6 | 0.4 | — |
| Misc. Co-Dimers | 5.9 | 6.4 | — |
| C$_5$'s | 2.8 | 4.0 | — |
| Inerts | 7.7 | 5.8 | 3.3 |
| Styrene | — | — | — |
| Indene | — | — | — |
| Vinyl Toluene | — | — | — |
|  | 72.0 | 72.0 | 66.0 |
| Component No. 2 |  |  |  |
| DAC-B | 14.0 | — | — |
| Isoprene | — | 2.8 | — |
| Piperylene | — | 11.2 | — |
| C$_5$ Olefin Mixture | — | — | 20.0 |
|  | 14.0 | 14.0 | 20.0 |
| Component No. 3 |  |  |  |
| Distilled Tall Oil | 14.0 | 14.0 | 14.0 |
| Total 3 Components: | 100.0 | 100.0 | 100.0 |

| Base Resins | Example I | Example II | Example III |
|---|---|---|---|
| Physical Properties |  |  |  |
| Ring & Ball softening point, °C. | 142.5 | 142 | 126 |
| Resin color (Barrett) | 1½ | 1½+ | 1½+ |
| Gardner Color (50% in toluene) | 11 | 11 | 9+ |
| Standard Stoddard solubility, °C. | −35/←60 | −35/←60 | −28/←60 |
| Resin Aniline point, °C. | 77.4 | 82.2 | 77.1 |
| ASTM Wijs Iodine No. | 167.4 | 169.5 | 144.2 |
| Acid No. | 3.93 | 3.78 | 5.33 |
| Gardner-Holdt solution viscosity at 25° C. (50%) resin in 470 Magie Oil) bubble seconds | 6.30→8.00 | 6.30→8.00 | 2.65 |
| Gardner-Holdt solution viscosity at 25° C. (60% resin in 42 Kauri Butanol gravure ink solvent) bubble seconds | 1.15→1.45 | 1.45 | 0.5→0.68 |
| Molecular Weight (No. Average) | 937 | 950 | 881 |
| Maleic-modified resins: |  |  |  |
| Physical Properties |  |  |  |
| Ring & Ball softening point, °C. | 152 | 150 | 152 |
| Resin Color (Barrett) | 2 | 1½+ | 2+ |
| Gardner Color (50% in toluene) | 12 | 11+ | 12+ |
| Standard Stoddard solubility, °C. | 45/28 | 31/18 | 65/21 |
| Resin Aniline Point, °C. | 59.8 | 62.6 | 67.3 |

TABLE III-continued

Component and Physical Property Data for Examples I-III

| | | | |
|---|---|---|---|
| ASTM Wijs Iodine No. | 158.7 | 161.8 | 125 |
| Acid No. | 17.1 | 17.95 | 18.5 |
| Gardner-Holdt solution viscosity at 25° C. (50 % resin in 470 Magie Oil) bubble seconds | (X←Y) 15 | (X←Y) 14 | (V←W) 14 |
| Gardner-Holdt-solution viscosity at 25° C. (60 % resin in 42 Kauri Butanol gravure ink solvent) bubble seconds | 2.15 | 2.15–2.65 | 1.80–2.15 |
| Molecular Weight (no. Ave.) | 984 | 1005 | 910 |

EXAMPLE II

This run was performed in the same manner as the run described in Example I immediately above, except that the Debutanized Aromatic Concentrate-B was substituted for with a mixture of approximately 2.8% isoprene and approximately 11.2% piperylene. The DCPD-rich fraction in this Example contained approximately 75% DCPD.

The base resin obtained in this run had physical properties as set out in Table III. After thermal maleation, the modified resin obtained had physical properties as set out in Table III.

Typical heat-set and gravure ink formulae may be prepared as in Example I.

EXAMPLE III

This run was performed in the same manner as Example II, except that essentially pure DCPD was used and the isoprenepiperylene component was substituted for with approximately 20.0% of a C$_5$ olefin mixture consisting essentially of equal volume percents of 2-methyl-2-butene, 1-pentene, cis-2-pentene, mixed 2-pentene and cyclopentene, as indicated in Table III. The resulting base resin had physical properties as set out in Table III.

After the maleation as in Examples I and III, the resulting maleic-modified hydrocarbon resin was found to have physical properties as set out in Table III.

Typical heat-set and gravure ink formulae may be prepared as in Example I.

EXAMPLE IV

This run is performed in a manner similar to Examples I-III, except that the components therein were substituted for as follows:

(1) approximately 77.0% DCPD rich hydrocarbon fraction (contains approximately 40% DCPD and approximately 20% methyl DCPD)

(2) approximately 10.0% DAC-B, and (3) approximately 13.0% distilled tall oil.

The base resin obtained has physical properties similar to the physical properties of the base resin of Examples I-III. After thermal maleation in a manner similar to that of Examples I-III, a modified resin is obtained having physical properties similar to the physical properties of the modified resins of Examples I-III.

Typical heat set and gravure ink formulae may be prepared as in Example I.

EXAMPLE V

This run is performed in a manner similar to Examples I–III, except that the components therein were substituted for as follows:
(1) approximately 72.0% DCPD-rich hydrocarbon fraction (contains approximately 75% DCPD)
(2) approximately 14.0% DAC-B, and
(3) approximately 14.0% stearic acid.

The base resin obtained has physical properties similar to the physical properties of the base resins of Examples I–III. After thermal maleation in a manner similar to tha of Examples I–III, a modified resin is obtained having physical properties similar to the physical properties of the modified resins of Examples I–III.

Typical heat-set and gravure ink formulae may be prepared as in Example I.

EXAMPLE VI

This run is performed in a manner similar to Examples I–III, except that the components therein were substituted for as follows:
(1) approximately 72.0% DCPD-rich hydrocarbon fraction (contains approximately 75% DCPD)
(2) approximately 14.0% DAC-C, and
(3) approximately 14.0% oleic acid.

The base resin obtained has physical properties similar to the physical properties of the base resins of Examples I–III. After thermal maleation in a manner similar to that of Examples I–III, a modified resin is obtained having physical properties similar to the physical properties of the modified resins of Examples I–III.

Typical heat-set and gravure ink formulae may be prepared as in Example I.

EXAMPLE VII

This run is performed in a manner similar to Examples I–III, except that the components therein were substituted for as follows:
(1) approximately 75.0% DCPD-rich hydrocarbon fraction (contains approximately 70% DCPD),
(2) approximately 14.0% DAC-B, and
(3) approximately 11.0% soya fatty acid.

The base resin obtained has physical properties similar to the physical properties of the base resins in Examples I–III. After thermal maleation in a manner similar to that of Examples I–III, a modified resin is obtained having physical properties similar to the physical properties of the modified resins of Examples I–III.

Typical heat-set and gravure ink formulae may be prepared as in Example I.

EXAMPLE VIII

This run is performed in a manner similar to Examples I–III, except that the components therein were substituted for as follows:
(1) approximately 80.0% methyl DCPD
(2) approximately 15.0% DAC-B, and
(3) approximately 5.0% gum rosin.

The base resin obtained has physical properties similar to the physical properties of the base resins of Example I–III. After thermal maleation in a manner similar to that of Examples I–III, a modified resin is obtained having physical properties similar to the physical properties of the modified resins of Examples I–III.

Typical heat-set and gravure ink formulae may be prepared as in Example I.

EXAMPLE IX

This run is performed in a manner similar to Examples I–III, except that the components therein were substituted for as follows:
(1) approximately 72.0% DCPD-rich hydrocarbon fraction (contains approximately 70% DCPD)
(2) approximately 23.0% DAC-C, and
(3) approximately 5.0% wood rosin.

The base resin obtained has physical properties similar to the physical properties of the base resins of Examples I–III. After thermal maleation in a manner similar to that of Examples I–III, a modified resin is obtained having physical properties similar to the physical properties of the modified resins of Examples I–III.

Typical heat-set and gravure ink formulae may be prepared as in Example I.

EXAMPLE X

In this run, approximately 750 grams of an initial reaction mixture consisting essentially of approximately 81.0% of a DCPD-rich hydrocarbon fraction, approximately 14.0% DAC-B and approximately 5.0% stearic acid are catalytically polymerized in the presence of a catalytically effective amount of aluminum chloride for a period of about 4 hours at a temperature from about 25° to about 75° C. The DCPD-rich hydrocarbon fraction contains approximately 40% DCPD and approximately 20% methyl DCPD. An inert diluent is present to control the reaction progress. At the end of the reaction period, a base resin is obtained having physical properties similar to the physical properties of the base resin in Examples I–III.

About 97 parts by weight of the base resin are reacted with about 3 parts by weight of maleic anhydride in the presence of a catalytically effective amount of an organic peroxide.

A maleic-modified hydrocarbon resin is obtained having physical properties similar to the physical properties of the modified resin of Examples I–III.

Typical heat-set and gravure ink formulae may be prepared as in Example I.

EXAMPLE XI

In this run, approximately 750 grams of an initial reaction mixture consisting essentially of approximately 70.0% DCPD-rich hydrocarbon fraction, approximately 13.0% DAC-B, approximately 14.0% oleic acid and approximately 3.0% maleic anhydride are charged to a thermal polymerization bomb and reacted for a period of about 24 hours at a temperature of about 245° to 250° C. The DCPD-rich hydrocarbon fraction contains approximately 75% DCPD. At the end of the reaction period, a resin is obtained having physical properties similar to the physical properties of the modified resins of Examples I–III.

Typical heat-set and gravure ink formulae may be prepared as in Example I.

The principles, preferred embodiments and modes of operation of the present invention have been described in the foregoing specification. The invention which is intended to be protected herein, however, is not to be construed as limited to the particular forms disclosed since these are regarded as illustrative rather than restrictive. Variations and changes may be made by those skilled in the art without departing from the spirit of the present invention.

I claim:

1. A dibasic acid-modified hydrocarbon resin suitable for use in heat-set and gravure printing ink compositions which resin consists essentially of the reaction product of at least one ethylenically unsaturated lower aliphatic dicarboxylic acid or anhydride with a base resin consisting essentially of a polymerized mixture of:
(a) a predominant amount of dicyclopentadiene; and lesser amounts of
(b) at least one hydrocarbon-containing material selected from the group consisting of debutanized aromatic concentrates, C5 olefins and acyclic, conjugated C5 dienes; and (c) at least one member selected from the group consisting of fatty acid-containing materials and rosin acid-containing materials; the dibasic acid-modified resin having a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

2. A resin according to claim 1 which resin consists essentially of the reaction product of from about three to about five parts maleic anhydride with from about ninety-seven to about ninety-five parts of a base resin consisting essentially of a polymerized mixture of:
(a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene;
(b) from about five to about twenty percent of at least one hydrocarbon-containing material selected from the group consisting of debutanized aromatic concentrates, C5 olefins and acyclic, conjugated C5 dienes; and
(c) from about ten to about thirty percent of a fatty acid-containing material selected from the group consisting of saturated fatty acid-containing materials, unsaturated fatty acid-containing materials and mixtures thereof, the maleic-modified resin having a Ring and Ball softening point of from about 140° C. to about 160° C.; a Gardner color of from about 10 to about 13; a definite Stoddard solubility of from about 20° C. to about 90° C.; an Acid Number of from about 15 to about 25; Gardner-Holdt solution viscosities at 25° C. (bubble seconds) of from about 1.15 to about 8.00 (60% resin in 42 Kauri butanol gravure ink solvent) and from about 10.0 to about 50.0 (50% resin in Magie 470 oil); and a number average molecular weight of from about 920 to about 1220.

3. A process for producing the dibasic acid-modified hydrocarbon resin of claim 1, which process comprises:
(1) copolymerizing a reaction mixture consisting essentially of:
(a) a predominant amount of dicyclopentadiene; and lesser amounts of
(b) at least one hydrocarbon-containing material selected from the group consisting of debutanized aromatic concentrates, C5 olefins and acyclic, conjugated C5 dienes; and
(c) at least one member selected from the group consisting of fatty acid-containing materials and rosin acid-containing materials;
to form a base resin having a Ring and Ball softening point of from about 120° C. to about 160° C.; a Gardner color of from about 9 to about 15; a definite Stoddard solubility of from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500, and
(2) reacting the base resin with at least one ethylenically unsaturated lower aliphatic dicarboxylic acid or anhydride in an amount sufficient to produce a modified resin having an Acid Number higher than the Acid Number of the base resin, the modified resin having a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

4. A process for producing the maleic-modified hydrocarbon/fatty acid-containing resin of claim 2, which process comprises:
(1) at a temperature of from about 230° C. to 270° C. and at autogenous pressure and under agitation, reacting a mixture consisting essentially of:
(a) from about fifty to about seventy-five percent of dicyclopentadiene or dicyclopentadiene-rich hydrocarbon fraction containing at least about seventy percent dicyclopentadiene and minor amounts of methyl dicyclopentadiene and codimers of cyclopentadiene and methyl cyclopentadiene;
(b) from about five to about twenty percent of a hydrocarbon-containing material selected from the group consisting of debutanized aromatic concentrates, C5 olefins and acyclic, conjugated C5 dienes; and
(c) from about ten to about thirty percent of a fatty acid-containing material selected from the group consisting of saturated fatty acid-containing materials, unsaturated fatty acid-containing materials, and mixtures thereof, to produce a base resin having a Ring and Ball softening point of about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 6.30 (60% resin in 42 Kauri butanol gravure ink solvent) and from about 3.20 to about 30 (50% resin in Magie 470 oil); and a number average molecular weight of from about 900 to about 1200; and
(2) reacting at a temperature of from about 200° C. to about 240° C. and under an inert gas blanket from about three to about five parts of maleic anhydride and about ninety-seven to about ninety-five parts of the base resin until a maleic-modified resin suitable for use in heat-set and gravure printing ink compositions, which resin has a Ring and Ball softening point of from about 140° C. to about 160° C., a Gardner color of from about 10 to about 13; a definite Stoddard solubility of from about 20° C. to about 90° C.; an Acid Number of from about 15 to about 25; Gardner-Holdt solution viscosities at 25° C. (bubble seconds) of from about 1.15 to about 8.00 (60% resin in 42 Kauri butanol gravure ink solvent) and from about 10.0 to about 50.0 (50% resin in Magie 470 oil); and a number average molecular weight of from about 920 to about 1220, is produced.

5. A base resin suitable for use in heat-set and gravure ink printing compositions, and which base resin consists essentially of a polymerized mixture of:
(a) a predominant amount of dicyclopentadiene; and lesser amounts of
(b) at least one hydrocarbon-containing material selected from the group consisting of debutanized aromatic concentrates, $C_5$ olefins and acyclic, conjugated $C_5$ dienes; and
(c) at least one member selected from the group consisting of fatty acid-containing materials and rosin acid-containing materials;
the base resin having a Ring and Ball softening point of from about 120° C. to about 160° C.; a Gardner color of from about 9 to about 15, a definite Stoddard solubility from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

6. A base resin according to claim 5 consisting essentially of a polymerized mixture of:
(a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene;
(b) from about five to about twenty percent of at least one hydrocarbon-containing material selected from the group consisting of debutanized aromatic concentrates, $C_5$ olefins and acyclic, conjugated $C_5$ dienes; and
(c) from about ten to about thirty percent of a fatty acid-containing material selected from the group consisting of saturated fatty acid-containing materials, unsaturated fatty acid-containing materials, and mixtures thereof, the base resin having a Ring and Ball softening point of from about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 6.30 (60% resin in 42 Kauri butanol gravure ink solvent) and from about 3.20 to about 30 (50% resin in Magie 470 oil); and a number average molecular weight of from about 900 to about 1200.

7. The improved resin of claim 6 where in the fatty acid-containing material comprises one or more saturated or unsaturated monocarboxylic acids containing from about 12 to about 22 carbon atoms per molecule.

8. A process for producing the base resin of claim 5, which process comprises:
copolymerizing a reaction mixture consisting essentially of:
(a) a predominant amount of dicyclopentadiene; and lesser amounts of
(b) at least one hydrocarbon-containing material selected from the group consisting of debutanized aromatic concentrates, $C_5$ olefins and acyclic, conjugated $C_5$ dienes; and
(c) at least one member selected from the group consisting of fatty acid-containing materials and rosin acid-containing materials
to form a base resin having a Ring and Ball softening point of from about 120° C. to about 160° C.; a Gardner color of from about 9 to about 15; a definite Stoddard solubility of from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

9. A process for producing the base resin of claim 6, which process comprises: at a temperature of from about 230° C. to 270° C. and at autogenous pressure and under agitation, reacting a mixture consisting essentially of:
(a) from about fifty to about seventy-five percent of dicyclopentadiene or a dicyclopentadiene-rich hydrocarbon fraction containing at least about seventy percent dicyclopentadiene and minor amounts of methyl dicyclopentadiene and codimers of cyclopentadiene and methyl cyclopentadiene;
(b) from about five to about twenty percent of a hydrocarbon-containing material selected from the group consisting of debutanized aromatic concentrates, $C_5$ olefins and acyclic, conjugated $C_5$ dienes; and
(c) from about ten to about thirty percent of a fatty acid-containing material selected from the group consisting of saturated fatty acid-containing materials, unsaturated fatty acid-containing materials, and mixtures thereof,
to produce a base resin having a Ring and Ball softening point of from about 130° C. to about 150° C.; a Gardner color of from about 10 to about 13; a definite Stoddard solubility of from less than about −60° C. to about 10° C.; an ASTM Wijs Iodine number of from about 130 to about 180; an Acid Number of from about 3 to about 5; Gardner-Holdt solution viscosities at 25° C. (bubble seconds) of from about 1.15 to about 6.30 (60% resin in 42 Kauri butanol gravure ink solvent) and from about 3.20 to about 30 (50% resin in Magie 470 oil); and a number average molecular weight of from about 900 to about 1200.

10. An improved resin suitable for use in heat-set and gravure printing ink compositions which resin consists essentially of the reaction product of:
(a) a predominant amount of dicyclopentadiene; and lesser amounts of
(b) at least one hydrocarbon-containing material selected from the group consisting of debutanized aromatic concentrates, $C_5$ olefins and acyclic, conjugated $C_5$ dienes;

(c) at least one member selected from the group consisting of fatty acid-containing materials and rosin acid-containing materials and (d) at least one ethylenically unsaturated lower aliphatic dicarboxylic acid or anhydride;

the improved resin having a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

11. A process for producing the improved resin of claim 10, which process comprises reacting at a temperature of from about 245° C. to about 250° C. for a period of about 16 to about 24 hours a mixture consisting essentially of:

(a) a predominant amount of dicyclopentadiene; and lesser amounts of (b) at least one hydrocarbon-containing material selected from the group consisting of debutanized aromatic concentrates, C₅ olefins and acylic, conjugated C₅ dienes;

(c) at least one member selected from the group consisting of fatty acid-containing materials and rosin acid-containing materials; and (d) at least one ethylenically unsaturated lower aliphatic dicarboxylic or anhydride, said at least one ethylenically unsaturated lower aliphatic dicarboxylic acid or anhydride being present in an amount sufficient to produce a resin having a Ring and Ball softening point of from about 130° C. to about 175° C.; a Gardner color of from about 9 to about 15; a definite Stoddard solubility of from about 0° C. to about 120° C.; an Acid Number of from about 10 to about 30; Gardner-Holdt solution viscosities at 25° C. (bubble seconds) of from about 0.92 to about 15.0 (60% resin in 42 Kauri butanol gravure ink solvent) and from about 8.00 to about 100 (50% resin in Magie 470 oil); and a number average molecular weight of from about 820 to about 1520.

12. The process of claim 3 therein the reaction mixture is thermally copolymerized.

13. The process of claim 3 wherein the reaction mixture is catalytically polymerized and wherein the base resin is reacted with the ethylenically unsaturated lower aliphatic dicarboxylic acid or anhydride in the presence of a catalyst.

14. The process of claim 8 wherein the reaction mixture is thermally copolymerized.

15. The process of claim 8 wherein the reaction mixture is catalytically copolymerized.

16. The process of claim 8 wherein the reaction mixture includes one or more aromatic olefinic monomers selected from the group consisting of vinyl toluene, styrene, alpha-methyl styrene, indene, coumarone, methyl coumarone, dimethyl styrenes and methyl indenes.

17. A base resin suitable for use in heat-set and gravure ink printing compositions, and which base resin consists essentially of a polymerized mixture of:

(a) a predominant amount of a member selected from the group consisting of methyl dicyclopentadiene and dimethyl-dicyclopentadiene; and lesser amounts of (b) at least one hydrocarbon-containing material selected from the group consisting of debutanized aromatic concentrates, C₅ olefins and acyclic, conjugated C₅ dienes; and (c) at least one member selected from the group consisting of fatty acid-containing materials and rosin acid-containing materials;

the base resin having a Ring and Ball softening point of from about 120° C. to about 160° C.; a Gardner color of from about 9 to about 15, a definite Stoddard solubility from less than about −60° C. to about 40° C.; an ASTM Wijs Iodine number of from about 120 to about 200; an Acid Number of from about 1.5 to about 6; Gardner-Holdt solution viscosities at 25° C. (bubble seconds) of from about 0.50 to about 8.00 (60% resin in 42 Kauri butanol gravure ink solvent) and from about 1.15 to about 50 (50% resin in Magie 470 oil); and a number average molecular weight of from about 800 to about 1500.

* * * * *